United States Patent [19]

Alt et al.

[11] 3,840,098

[45] Oct. 8, 1974

[54] MULTI-CIRCUIT BRAKE INSTALLATION FOR VEHICLES, ESPECIALLY MOTOR VEHICLES

[75] Inventors: Claus-Christian Alt, Weiler O.D. Fils; Alf Müller, Bittenfeld; Friedrich H. Van Winsen, Kirchheim/Teck, all of Germany

[73] Assignee: Daimler-Benz Aktiengesellschaft, Stuttgart-Unterturkheim, Germany

[22] Filed: Nov. 27, 1972

[21] Appl. No.: 309,913

Related U.S. Application Data

[63] Continuation of Ser. No. 100,585, Dec. 22, 1970, abandoned.

[30] Foreign Application Priority Data

Dec. 23, 1969 Germany .......................... 1964364

[52] U.S. Cl. .............................. 188/345, 303/6 R
[51] Int. Cl. ........................ B60t 11/20, B60t 11/24
[58] Field of Search ........ 60/54.5 E, 54.6 R, 54.6 E, 60/581, 582; 92/151; 188/106 P, 151 A, 345; 303/6 R

[56] References Cited
UNITED STATES PATENTS

| 2,732,918 | 1/1956 | Hackworth | 188/345 |
| 3,456,766 | 7/1969 | Beller | 188/106 P X |

FOREIGN PATENTS OR APPLICATIONS

| 1,146,888 | 5/1957 | France | 188/345 |
| 599,937 | 6/1960 | Canada | 188/345 |

*Primary Examiner*—Trygve M. Blix
*Assistant Examiner*—Stephen G. Kunin
*Attorney, Agent, or Firm*—Craig & Antonelli

[57] ABSTRACT

A multi-circuit brake installation for vehicles, especially for motor vehicles, whose hydraulic brake systems are constructed at least as a three-circuit brake system; the system is such that the two front wheel brakes can be braked by means of a first circuit as well as by means of a second circuit while the two rear wheels can be braked by means of a third circuit.

23 Claims, 8 Drawing Figures

MULTI-CIRCUIT BRAKE INSTALLATION FOR VEHICLES, ESPECIALLY MOTOR VEHICLES

This is a continuation of application Ser. No. 100,585 filed Dec. 22, 1970, now abandoned.

The present invention relates to a multi-circuit brake installation for vehicles, especially for motor vehicles, whose hydraulic brake system is constructed at least as a three-circuit brake system.

With a three-circuit brake installation described in particular in the co-pending application Ser. No. 36,751, filed on May 13, 1970 now abandoned and assigned to the assignee of the present application, the subject matter of which is incorporated herein by reference to the extent necessary, a first front wheel is braked by the first circuit, the second front wheel is braked by the second circuit, and the two rear wheels of the vehicle are braked by the third circuit. Though such a system entails the advantage of particular simplicity, it can be used in practice only with a small or a negative roll radius of the steered front wheels because only in that case an undesired torque or angular momentum in the steering sense can be avoided in case of failure or loss of one of the two front wheel brake circuits.

It is, however, desirable to utilize with advantage a three-circuit brake system according to the aforementioned co-pending application also with a front wheel steering arrangement of conventional type of construction, i.e., having a larger positive roll radius of the front wheels, and to avoid any influencing of the steering safety in case of failure or loss of a front wheel brake circuit by brake forces acting unilaterally on one front wheel. Accordingly, the present invention essentially consists in that, in particular with a three-circuit brake system, the two front wheels are braked by means of a first circuit as well as by means of a second circuit and the two rear wheels are braked by a third circuit.

On the one hand, as in the aforementioned co-pending application, the following advantages are attained:

By the use of a three-circuit brake system a double safety against total failure of the brake installation as well as a higher attainable braking in case of failure of one circuit can be realized. With thermal overloading or overheating of only one wheel brake, at the most two circuits fail under the most unfavorable circumstances, i.e., in case of overheating of a front wheel brake, so that always at least one brake circuit remains intact as with the simple two-circuit brake installation whereas with the so-called "expanded two-circuit systems," in which both systems act at least on one identical wheel, the entire brake installation may fail in case of overheating and as a result of vapor-formation occurring thereby in both circuits. Also, the lever paths or displacements which have to be traversed additionally in case of failure of a circuit as well as the actuating forces to be applied remain smaller in the most unfavorable case than with a two-circuit system.

On the other hand, in contradistinction to the embodiment of a three-circuit brake installation as described in the aforementioned application, a front-wheel steering system with any desired large positive—or also negative—roll radius, approximately in the sense of the customary type of construction, may be used therebeyond with a brake installation according to the present invention.

Accordingly, it is an object of the present invention to provide a multi-circuit brake installation for vehicles, especially for motor vehicles which avoids by simple means the aforementioned shortcomings and drawbacks encountered in the prior art.

Another object of the present invention resides in a multi-circuit brake installation for vehicles which permits the use of any customary front-wheel steering construction without impairing the safety of the braking operation in case of failure or loss of one of the circuits.

A further object of the present invention resides in a multi-circuit brake system for motor vehicles in which, in case of overheating of the brakes of one wheel, at least one circuit remains intact, thereby greatly increasing the safety of the vehicle.

A still further object of the present invention resides in a brake installation of the type described above which can be used, without any adverse effect, with either a positive or negative roll radius in the front wheel steering construction.

These and further objects, features and advantages of the present invention will become more obvious from the following description when taken in connection with the accompanying drawing which shows, for purposes of illustration only, one embodiment in accordance with the present invention, and wherein.

Figure 1:
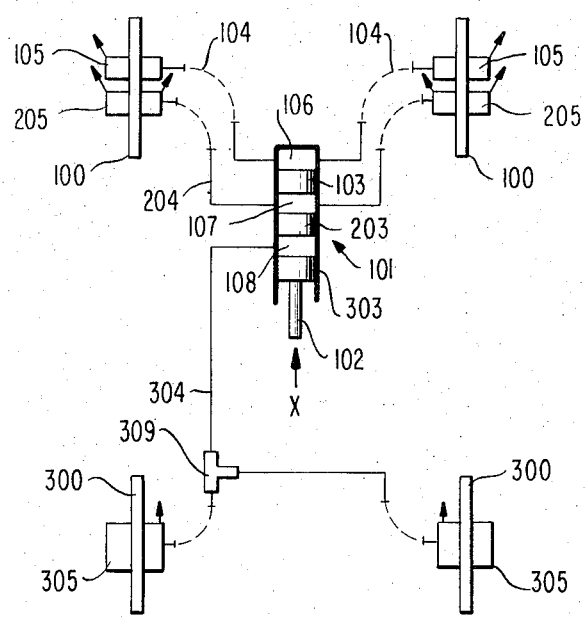
FIG. 1 is a schematic view of a three-circuit brake system in accordance with the present invention.

Referring now to the drawing wherein like reference numerals are used throughout the various views to designate like parts, and more particularly to FIG. 1, the brake discs of the two front wheels are designated in this figure by reference numeral 100, and the brake discs of the two rear wheels are designated by reference numeral 300. The pistons of the schematically indicated and pair-wise arranged brake cylinders 105 of the brake circuit 104 as well as the pistons of the correspondingly schematically indicated and pair-wise arranged brake cylinders 205 of the brake circuit 204 may act on each of the brake discs 100. The brake cylinders 105 and 205 are thereby arranged, for example, one above the other in a conventional manner on a double-saddle or double-caliper carrying the brake cylinder, which are arranged on the front axle or are supported by the front wheel suspension secured against entrainment in the direction of rotation of the brake discs. The venting of the brake cylinders is schematically indicated by the arrows provided thereat, whereby the venting of the upper cylinders 105 can take place in common exclusively toward the outside whereas it is generally necessary as a result of structural conditions to vent the lower cylinders 205 separately from one another either toward the outside or toward the inside.

Figure 4:
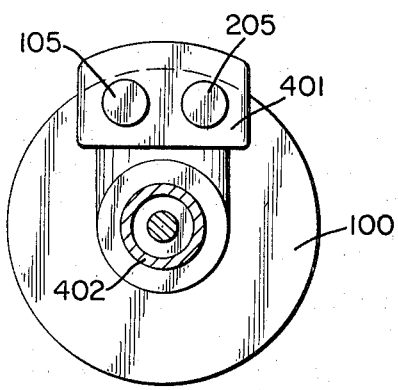
FIG. 4 is a schematic view of brake cylinders arranged in brake saddle means mounted at a fixed axle part.
Figure 5:
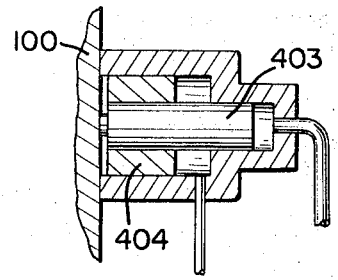
FIG. 5 is a schematic cross-sectional view of nested pistons of differential type of construction.

Instead of being arranged on a double saddle or double caliper, the brake cylinders 105 and 205 may be arranged, for example, also in brake saddles 401 or brake calipers mounted separately from one another at a fixed axle part, preferably at the axle spindle 402 or steering knuckle of the wheel as shown in FIG. 4, or may be equipped with pistons 403 and 404 nested one within the other and of differential type of construction as shown in FIG. 5.

The braking of the rear wheels takes place by the pistons of the brake cylinders 305 which are arranged, similar as in the case of the front wheel brakes, pairwise on both sides of the brake discs 300 and are actuated by the brake circuit 304, for example, including distributor 309.

The actuation of the brake circuits takes place by the master brake cylinder generally designated by reference numeral 101 including the three pressure pistons 103, 203 and 303 which delimit the pressure spaces 106, 107 and 108 corresponding to the aforementioned co-pending application and can be actuated either by hand or by foot in the actuating direction indicated by arrow x by means of the plunger 102, as a rule, with the interconnection of an amplifier or servo device.

Figure 2:
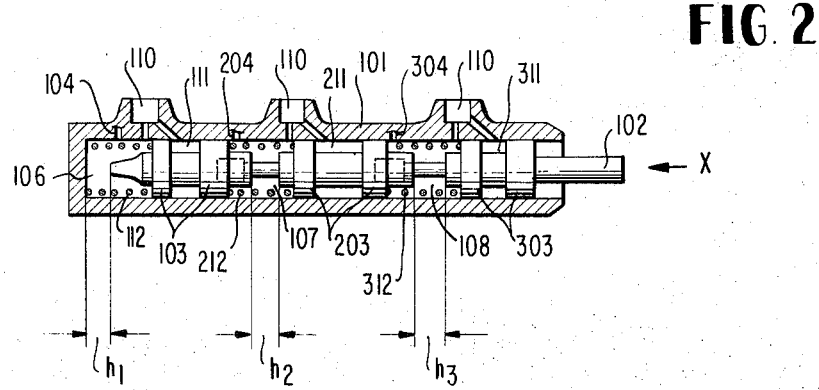
FIG. 2 is a longitudinal cross-sectional view through the master brake cylinder of a brake system in accordance with the present invention.

The master brake cylinder 101 of a type of construction corresponding approximately to the schematic showing thereof in FIG. 1 is illustrated in detail in FIG. 2. Each of the pressure spaces 106, 107 and 108 is provided with a connection 110 for a pressure-oil reservoir or tank in such a manner that the reservoir or tank is in communication in the outer (non-actuated) end position of the pressure pistons 103, 203 and 303 with the pressure spaces 106, 107 and 108. Furthermore, a connection of the pressure tank to the ring grooves 111, 211 and 311 of the pistons 103, 203 and 303 is provided. Each of the pistons 103, 203 and 303 is approximately provided with a seal of any conventional construction (not shown) on both sides of the annular grooves 111, 211 and 311. Return springs 112, 212 and 312 seek to keep the pistons 103, 203 and 303 in their non-actuated, outermost end position.

The relative strokes between the pressure pistons 103, 203 and 303 of the master brake cylinder 101 are designated by reference characters $h_1$, $h_2$ and $h_3$. If the plunger 102 is actuated in the direction of arrow $x$, then the pressure pistons are guided with respect to one another within these relative strokes until the pistons abut in the brake cylinders 105, 205 and 305 at the associated brake discs.

If one of the brake circuits fail, then the relative stroke of the pressure piston coordinated to this circuit increases, depending on leakage or vapor formation in the corresponding circuit.

Figure 6:
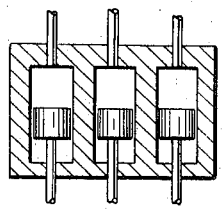
FIG. 6 is a schematic cross-sectional view of parallel cylinders forming a multi-chamber master brake cylinder.
Figure 7:
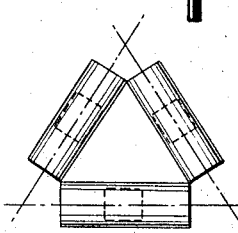
FIG. 7 is a schematic view of a multi-chamber master brake cylinder arranged in the form of a triangle.
Figure 8:
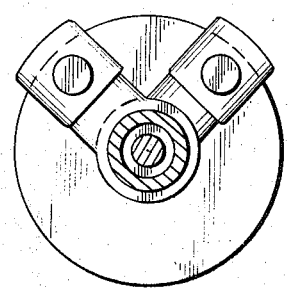
FIG. 8 is a schematic view of brake cylinder means arranged on brake saddle means mounted separately from another at a fixed axle part.

Possibly the multi-chamber master brake cylinder may also consist of individual cylinders disposed parallel to one another as shown in FIG. 6, especially in a structural unit which is arranged in a single plane, for example, in the form of a triangle as shown in FIG. 7.

Figure 3:
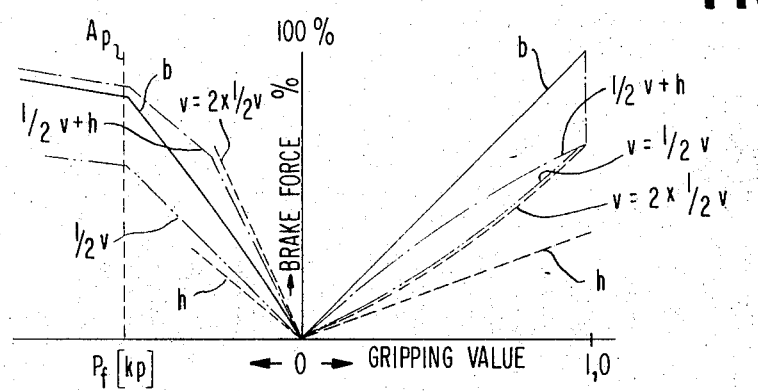
FIG. 3 is a diagram for the brake forces in a system of the present invention.

In FIG. 3, the brake force in percentage of the maximum possible brake force is illustrated as a function of the foot force or pedal force $P_f$ and as a function of the gripping value. The curve $v$ in dash lines thereby represents the brake force at the front axle and the curve $h$ the brake force at the rear axle, i.e., that brake force which is attainable if either the front wheel brakes alone or the rear wheel brake alone are or is operable, that is, the other brake or brakes are respectively out of operation. The curve $1/2v = h$ (on the right)—in dash and dot lines—illustrates the brake forces which are attainable in case of failure of one of the two front wheel brake circuits—corresponding to the coordinated pedal forces (left).

The foot or pedal force is designated by full line curve $b$ (left) and the attainable brake force is designated by full line curve $b$ (right) which normally can be attained, i.e., especially when the rear wheels lock.

It is assumed in FIG. 3 that an amplifier or servo mechanism is interconnected between the foot actuation and the master brake cylinder. As a rule, the amplifier is limited in its amplification by a control point $A_p$ so that in case of exceeding a predetermined pedal force a further amplification is no longer possible which is indicated by a corresponding down-bend of the foot force curves (left).

If one front wheel brake fails, the decrease of the brake force is relatively slight (curve $1/2v = h$). Also, the brake pedal force or foot force $P_f$ is relatively small for the production of a predetermined brake force —corresponding to the steep rise of the curve $1/2v = h$ for the foot force $P_f$—and considerably smaller than in case of a failure of a brake circuit in a two-circuit brake installation.

While we have shown and described only one embodiment in accordance with the present invention, it is obvious that the same is not limited thereto but is susceptible of numerous changes and modifications as known to those skilled in the art. For example, the actuation can take place also manually or in any other suitable manner instead of by foot. Furthermore, the present invention is not limited to disc brakes. Additionally, the present invention may also be used in conjunction with a multi-circuit brake installation in which in addition to the three brake circuits provided according to the present invention, one or several additional brake circuits are provided.

Thus, it is obvious that the present invention is susceptible of numerous changes and modification, and we therefore do not wish to be limited to the details shown and described herein, but intend to cover all such changes and modifications as are encompassed by the scope of the appended claims.

What I claim is:

1. A multi-circuit brake installation for a vehicle constructed as only a three-circuit brake system including first, second and third independent brake circuit means, characterized in that the vehicle includes first and second pairs of wheels with respectively one wheel of each pair on each side of the vehicle, each of the wheels being provided with brake means, each of the first and second brake circuit means being connected with a respective brake means of the first pair of wheels, each of the first and second brake circuit means being arranged for always simultaneously controlling the respective brake means of the first pair of wheels, and the third brake circuit means being connected with the brake means of the second pair of wheels for actuation thereof, said brake circuit means being provided in a multi-chamber master brake cylinder means forming a structural unit, and each of said first, second and third brake circuit means including only a single pressure piston movable with respect to an associated cylinder chamber of the cylinder unit for the brake medium.

2. A multi-circuit brake installation according to claim 1, characterized in that the brake means are hydraulically actuated brakes of a hydraulic brake system.

3. A multi-circuit brake installation according to claim 1, characterized in that the master brake cylinder means includes the pressure piston series-connected in tandem arrangement, and in that the pressure piston of the master brake cylinder means are series-connected force-lockingly up to abutment at an adjacent pressure piston and at a fixed abutment part, respectively.

4. A multi-circuit brake installation according to claim 3, characterized in that said pressure piston are force-lockingly series-connected with each other by the interposition of spring means and a relative stroke.

5. A multi-circuit brake installation according to claim 1, characterized in that the multi-chamber master brake cylinder means essentially consists of individual cylinders disposed substantially parallel to one another in the structural unit.

6. A multi-circuit brake installation according to claim 5, characterized in that the structural unit of said individual cylinders is arranged in a single plane.

7. A multi-circuit brake installation according to claim 5, characterized in that said multi-structural unit is arranged in a single plane in the form of a triangle.

8. A multi-circuit brake installation according to claim 1, characterized in that the multi-chamber master brake cylinder means essentially consists of individual cylinders disposed substantially parallel to one another in the structural unit.

9. A multi-circuit brake installation according to claim 8, characterized in that the structural unit of said individual cylinders is arranged in a single plane.

10. A multi-circuit brake installation according to claim 8, characterized in that said multi-structural unit is arranged in a single plane in the form of a triangle.

11. A multi-circuit brake installation according to claim 1, wherein each of said cylinder chambers is in constant exclusive communication with a respective brake piston of the brake means of a right and a left wheel of one of the first and second pairs of wheels of the vehicle.

12. A multi-circuit brake installation according to claim 1, wherein said first and second brake circuit means each actuate a respective brake means of the first pair of wheels and said third brake circuit means actuate a respective brake means of the second pair of wheels.

13. A multi-circuit brake installation according to claim 12, wherein the first pair of wheels is the front wheels of the vehicle and the second pair of wheels is the rear wheels of the vehicle.

14. A multi-circuit brake installation according to claim 13, with brake means including brake cylinder means for each wheel, characterized in that the brake cylinder means of the two brake circuit means acting each on a respective brake disc of the front wheels are arranged on a double brake saddle means carrying the brake cylinder means.

15. A multi-circuit brake installation according to claim 13, with brake means including brake cylinder means for each wheel, characterized in that the brake cylinder means of the two brake circuit means acting on a respective brake disc of the front wheels are arranged on brake saddle means mounted separately from one another at a fixed axle part.

16. A multi-circuit brake installation according to claim 15, characterized in that said brake saddle means are arranged at an axle spindle.

17. A multi-circuit brake installation according to claim 13, with brake means including brake cylinder means and brake disc means for each wheel, characterized in that the brake cylinder means of the two circuit means acting on a respective brake disc means of the front wheels are equipped with nested piston means of differential construction.

18. A multi-circuit brake installation according to claim 13, characterized in that the master brake cylinder means includes the pressure piston series-connected in tandem arrangement, and in that the pressure piston of the master brake cylinder means are series-connected force-lockingly up to abutment at an adjacent pressure piston and at a fixed abutment part, respectively.

19. A multi-circuit brake installation according to claim 18, with brake means including brake cylinder means for each wheel, characterized in that the brake cylinder means of the two brake circuit means acting each on a respective brake disc of the front wheels are arranged on a double brake saddle means carrying the brake cylinder means.

20. A multi-circuit brake installation according to claim 18, with brake means including brake cylinder means for each wheel, characterized in that the brake cylinder means of the two brake circuit means acting on a respective brake disc of the front wheels are arranged on brake saddle means mounted separately from one another at a fixed axle part.

21. A multi circuit brake installation according to claim 18, with brake means including brake cylinder means and brake disc means for each wheel, characterized in that the brake cylinder means of the two circuit means acting on a respective brake disc means of the front wheels are equipped with nested piston means of differential construction.

22. A multi-circuit brake installation according to claim 13, characterized in that each of the first and second brake circuit means connected with the brake means of each of the front wheels provides the same braking force for the front wheels.

23. A multi-circuit brake installation according to claim 1, wherein each of the first, second and third brake circuit means provide a symmetrical braking effect at the associated pair of wheels.

* * * * *